Oct. 13, 1970 R. E. DAVIES 3,534,170

SYNCHRONISATION OF TELEVISION SIGNALS

Filed Sept. 11, 1967 2 Sheets-Sheet 1

Inventor
Robin Evan Davies
By
Kemon, Palmer, Stewart + Estabrook
attorneys

Inventor
Robert Evan Davies
By Kemon, Kemon, Stewart & Estabrook
Attorneys

United States Patent Office 3,534,170
Patented Oct. 13, 1970

3,534,170
SYNCHRONISATION OF TELEVISION SIGNALS

Robin Evan Davies, Horley, Surrey, England, assignor to The Marconi Company Limited and Standard Telephones & Cables Limited, both of London, England Filed Sept. 11, 1967, Ser. No. 666,578
Claims priority, application Great Britain, Oct. 12, 1966, 45,588/66
Int. Cl. H04n 5/04
U.S. Cl. 178—69.5 8 Claims

ABSTRACT OF THE DISCLOSURE

First and second television signals of nominally the same field frequency are synchronised in field frequency and phase by delaying the first signal in a delay device which consists of a series of delay elements the delay times of which are related by power of 2 interconnected by cross-over switches. The positions of the switches are adjusted in dependence upon a determination made from line to line of the first signal of the delay required for the next line in order to bring it into synchronism with the corresponding line of the second signal. An the output of the first delay device and constitutes a fine store. An interpolator is connected to the input of the first delay device to combine in variable proportions the signals of each line with either signals of the corresponding line in the preceding picture or signals of an adjacent line in the same picture or signals of an adjacent line in the first signal.

Figure 1:
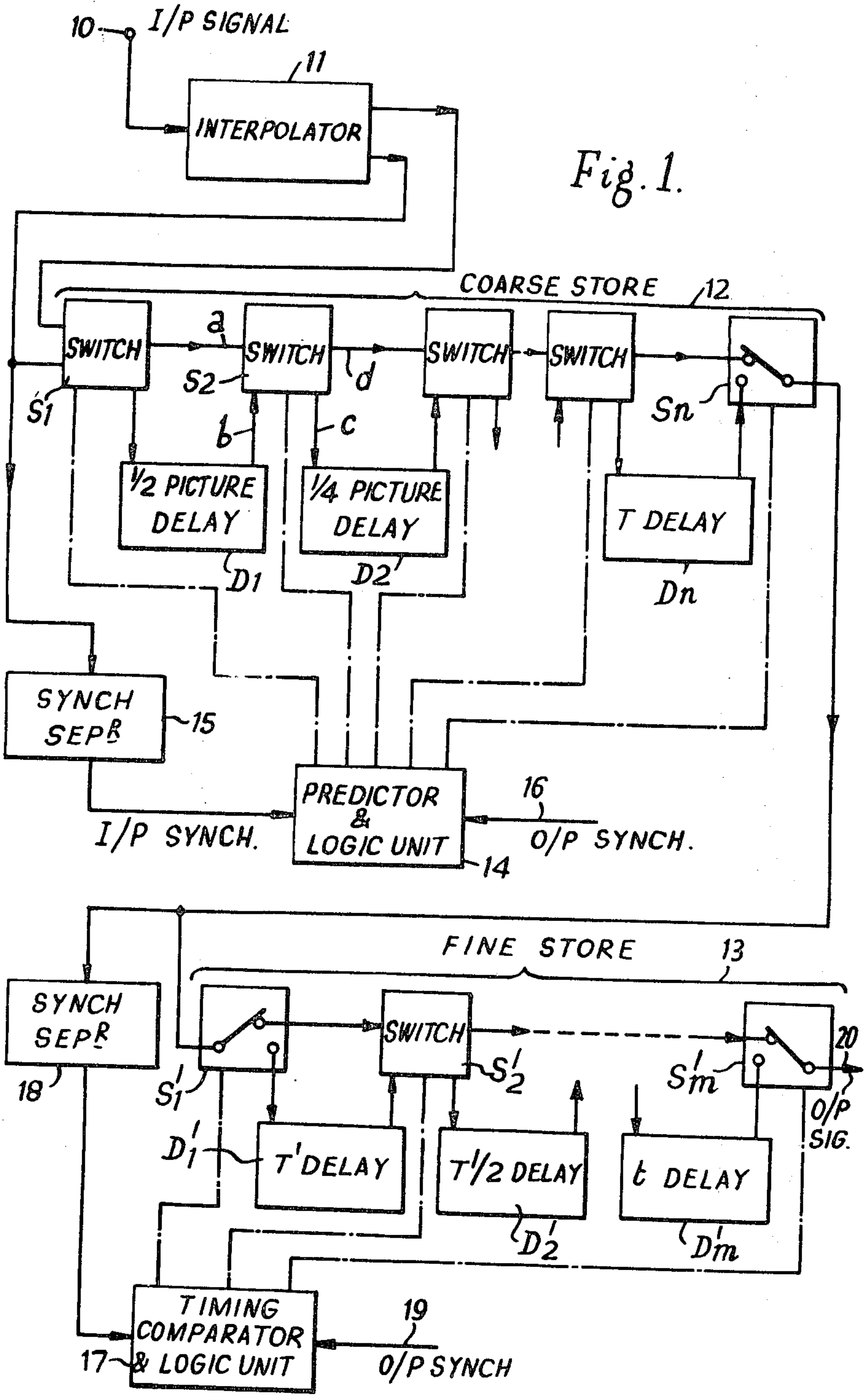

The present invention relates to the synchronisation of television signals.

When television signals for local transmission are received from remote sources (for example, over the Eurovision link) it is sometimes necessary that they should be locked to local station synch pulses in order to facilitate mixing, fading and other like processes. The locking can be carried out using an image-transfer converter (in which the remote signals are applied to produce a television picture and are scanned under the control of the local synch pulses) but a significant amount of picture impairment occurs.

The present invention provides an improved means for effecting the required locking. The invention is based upon techniques used in standards conversion and described in the specifications of United States Pat. Nos. 3,400,211 and 3,457,369, and also in a paper by W. Wharton and R. E. Davies: "Field-store conversion; conversion between television signals with different field frequencies using ultrasonic delays," Proc. I.E.E., vol. 113, No. 6, June 1966.

Thus according to the present invention there is provided apparatus for synchronising a first television signal in field frequency and phase with a second television signal of nominally the same frequency, the apparatus comprising a variable delay device arranged to delay the first signal, means for determining from line to line of the first signal the delay required for the next line in order to bring it into synchronism with the corresponding line of the second signal, and means for adjusting the said delay device in dependence upon said determination. The variable delay device includes a series of delay elements the delay times of which are related by powers of 2 and a plurality of cross-over switches, one output terminal of each switch being connected through a delay element to one input terminal of the succeeding switch and the other output terminal being connected directly to the other input of the said succeeding switch.

If the frequencies of the first and second signals are identical, the delay required will be constant, but in the general case where the frequencies differ the delay must be varied, usually slowly.

If the delay is required to increase, the amount of information stored in the delay device must on occasions be reduced by a picture duration so as to omit a complete picture from the input signal. If the delay is required to decrease, the amount stored must on occasions be increased by a picture duration so as to repeat a complete picture. In this case steps must be taken to ensure that the picture has been stored in the delay so that it is available for repetition, and this is achieved in this invention by the use of cross-over switches in conjunction with the delay elements. The delay device must be capable of storing a complete picture.

It is possible to provide a more economic arrangement by ommission or repetition of fields rather than of pictures, it being arranged that either an odd or an even field can be used to form a given output field. The delay requirements can then be reduced so that only values up to a complete field duration are necessary. There will then be a small vertical shift of the picture due to the use of either an odd or an even field to form any given output field; the type of input field used would change at a rate equal to the difference between the input and output field frequencies. Some form of interpolation to correct for this effect may be essential.

The apparatus preferably also includes an additional delay device connected to the output of the above-mentioned delay device and constituting a fine store. The additional delay device provides a delay of from a small fraction of a picture element up to about the smallest element of the first delay device. Preferably, the additional delay device comprises a further series of delay elements the delay times of which are related by powers of 2, interconnected by further switches, and the apparatus also includes means connected to the output of the first device and to receive the second signal for determining from line to line of the first signal the delay required for the next line in order to bring it into synchronism with the corresponding line of the second signal, and means for positioning the further switches in dependence upon the said determination. It should be noted that change of delay during the active line signal is not necessary since the difference occurring in the duration of one line period are usually sufficiently small for the resulting change in picture geometry to be negligible. Thus the delay time has to be reset from line to line of the input signal, say to within an amount not greater than one tenth of a picture element. Such an amount is known to be the maximum variation of line timing error that is just "not perceptible."

Figures 2, 3, 4:
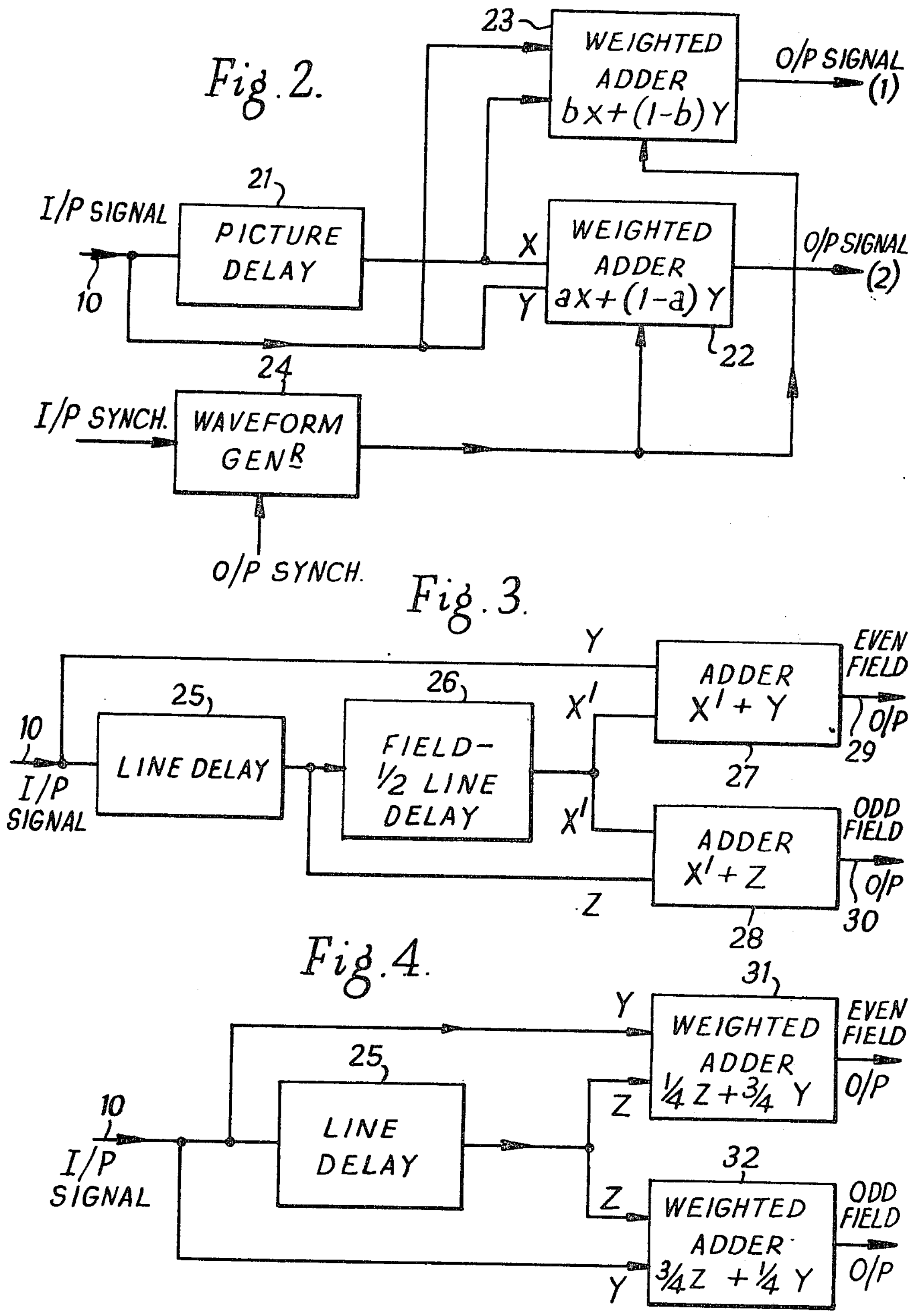

The invention will be described, by way of example, with reference to the accompanying drawings in which:

FIG. 1 is a block circuit diagram of one embodiment of the invention where the maximum delay introduced is equal to one picture period, FIG. 2 shows, in block diagram, one form that the interpolator of FIG. 1 may take, and FIGS. 3 and 4 show, in block diagram, alternative forms of interpolator for use with a modification of FIG. 1 in which the maximum delay is equal to one field period.

Referring to FIG. 1, an input signal is applied at a terminal 10 to an interpolator 11, which will be described later, the outputs of the interpolator being applied to a delay device or store. The delay device used is a binary device such as is more fully described in the prior publications already mentioned and comprises a number of electronically operated switches each arranged to control the inclusion and exclusion of a section of delay device.

The control logic of the apparatus of FIG. 1 which operates between two nominally identical standards has two main functions. Firstly, from line to line of the input line signal, a prediction must be made of the delay required for that line signal and secondly the switches controlling the delays must be set to the appropriate state. It must be noted that the operaion of the switches controlling the delays must be retarded so that operation occurs when the signal has reached the switch having passed through the previous delays.

In the embodiment of FIG. 1, in addition to the coarse store 12 there is a fine store 13. The coarse store 12 has a number of cross-over switches $S_1 \ldots S_n$ interconnecting and controlling delay sections $D_1 \ldots D_n$ the delays of which vary in binary steps from ½ picture period to T which may equal 2 μs for a 625/50 (that is a 625 line 50 fields per second) standard. Each switch has two inputs, *a* and *b*, and two outputs, *c* and *d*, and switches either *a* to *c* and *b* to *d* or *a* to *d* and *b* to *c*. The switches, and hence the amount of delay introduced by the coarse store, are adjusted under the control of signals from a predictor and logic unit 14 which is in turn controlled by input synchronising signals from a synch separator 15 and output synch signals with which the input signals have to be synchronised and which are applied at 16.

The prediction of delay by the device 14 can be achieved by keeping records, in digital form, of the positions in the field or picture of the curernt input line and the current output line. The delay required in units of output line duration can be computed from these two numbers. An appropriate additional delay must be added which is a fraction of an output line period and which depends on the current relative phase of the input and output line synch pulses. The resultant total delay can then be converted to the number of units of delay required in the store by arithmetic processes.

As mentioned above, when the delay is required to decrease, the amount stored must on occasions be increased by a picture duration so as to repeat a complete picture. The use of cross-over switches means that there are always two paths through the coarse store 12, and when the delay in one path is zero, the delay in the other path is approximately equal to one picture period (actually one picture period minus T). Thus the picture is stored in the delay and is available for repetition.

The output of the coarse store 12 is fed to the fine store 13 which is, for convenience, of the same design as the coarse store and comprises switches $S'_1 \ldots S'_m$ controlling sections $D'_1 \ldots D'_m$ of delay the delay varying in binary steps from T′ which may be approximately equal to 2 μs to *t* which may be approximately equal to ¹⁄₁₀ of a picture element (say 10 μs for a 625/50 picture).

The error of the coarse store 12 that has to be corrected by the fine store 13 is the sum of two parts, namely the error in prediction and an error which is always less than T/2 due to the finite unit in the coarse store 12. The adjustment of the switches, and hence the delay, in the fine store is effected by a timing comparator and logic unit 17 which compares the timing of synch pulses which have traversed the coarse store and are derived from a synch separator 18 with the output synch pulses applied at 19. The synchronised output is taken from a terminal 20.

When a picture is omitted or repeated, an interruption in the steady flow of information occurs which is analogous to the removal of a frame from a cine film and will cause a "jerk" in the movement of the portrayed scene. This disturbance will occur repeatedly at a frequency equal to the difference between the picture frequencies on the input and output standards. In many cases the jerks in movement will be infrequent and their effect will not be serious enough to warrant special consideration. However, in cases where either frequency is mains-locked, the difference might be as much as 1 Hz. The movement portrayal might then be seriously impaired and some form of interpolation which may be provided by the interpolator 11 is desirable.

The interpolator 11 may take the form indicated in FIG. 2. Thus the input signal at 10 is applied to a device 21 introducing a delay equal to one picture period. The delayed signal X and the undelayed signal Y are applied to weighted adders 22 and 23, the adder 22 producing an output signal (1) equal to $aX+(1-a)Y$ and the adder 23 an output equal to $bX+(1-b)Y$, where $a$ and $b$ are weighing factors. These factors are made to depend on the input and output standards by means of a waveform generator 24 fed with input and output synch pulses. The weighed signals $aX+(1-a)Y$ may be produced by adding Y to $a(X-Y)$, the latter term being produced using well-known techniques, for example, a Hall multiplier as described in a paper by R. P. Charman, E. Cohen and D. P. Holmes, "The Design and Performance of a Hall Effect Multiplier," Proc. I.E.E., vol. 106, Part B, Supplement No. 16.

It should be noted that each interpolator 11 is sometimes required to produce two pictures simultaneously, one of which will be stored in the binary delay for transmission to the output after the other. Thus two outputs are necessary to the binary store. These are the outputs referred to as (1) and (2).

The circuit of FIG. 1 is suitable where a picture has to be omitted or repeated at intervals. For the case where a field has to be omitted or repeated the same circuit can be used by so modifying the coarse store that the longest delay section introduces a delay of ½ field instead of ½ picture the remainder of the delay being correspondingly modified. The last section $D_n$ may, however, still have a delay of 2 μs and the fine delay may be as shown in FIG. 1.

Two alternative forms of interpolator for use with such a modified form of FIG. 1 are shown in FIGS. 3 and 4. The circuit of FIG. 3 comprises a line delay 25 producing an output Z delayed by one line period relative to the input Y, a delay 26 producing an output X′ delayed by one field period minus ½ line period relative to Z, and two adders 27 and 28 producing outputs $X'+Y$ and $X'+Z$ respectively. An even-field output is taken at 29 and an odd-field output is taken at 20. Means (not shown) are provided to select whichever output is appropriate at the time. Since the omission or repetition of a field interrupts the normal odd-even field cycle, in practice it is only necessary to switch from one output of the interpolator to the other when this occurs.

The alternative form of interpolator shown in FIG. 4 comprises a line delay 25 and two weighted adders producing outputs $Z/4+Y/4$, the former giving an even field and the latter an odd field.

The effects of the circuits of FIGS. 3 and 4 are that in the case of FIG. 3, each line signal is added to the immediately preceding line signal in the same picture to form even fields and added to the immediately succeeding line signal to form odd fields. In the case of FIG. 4, each line signal is combined with the line signal immediately preceding it in the same field in the ratio of 1:3 for even fields and 3:1 for odd fields. The ratios 1:3 and 3:1 are examples of possible ratios; in practice, an alternative pair of numbers may be more suitable.

What is claimed is:

1. Television synchronising apparatus for synchronising a first television signal in field frequency and phase with a second television signal of nominally the same field frequency, said apparatus comprising:

a first input terminal to receive said first television signal;

a second input terminal to receive said second television signal;

a variable delay device connected to said first input terminal, said delay device including a series of delay elements the delay times of which are related by power of 2, and a plurality of cross-over switches connected between said delay elements with one output of each switch connected through a delay element to one input of the succeeding switch, and the other output connected directly to the other input of said succeeding switch;

an output terminal connected to the output of said variable delay device;

means connected to said first and second input terminals to determine from line to line of said first signal the delay required to bring it into synchronism with the corresponding line of said second signal; and means for positioning said switches in dependence upon said determination.

2. Apparatus as claim in claim 1, wherein said positioning means is operative before each line of said first signal.

3. Apparatus as claimed in claim 1, further comprising an additional variable delay device connected to said output terminal and constituting a fine store.

4. Apparatus as claimed in claim 3, wherein said additional delay device comprises:

a further series of delay elements tse delay times of which are related by powers of 2; and further switches interconnecting said further delay elements; said apparatus further comprising:

means connected to said output terminal and to said second input terminal to determine from line to line of said first signal the delay required for the next line in order to bring it into synchronism with the corresponding line of said second signal; and means for positioning said further switches in dependence on said determination.

5. Apparatus as claimed in claim 1, further comprising an interpolator connected between said first input terminal and said variable delay device to combine with signals of each line signals of the corresponding line in the preceding picture.

6. Apparatus as claimed in claim 5, wherein said signals are combined in proportions dependent upon synchronising signals of said first and second television signals.

7. Apparatus as claimed in claim 1, further comprising an interpolator connected between said first input terminal and said variable delay device to combine with signals of each line signals of an adjacent line in the picture.

8. Apparatus as claimed in claim 1, further comprising an interpolator connected between said first terminal and said variable delay device to combine with signals of each line signals of an adjacent line in said first signal.

References Cited

UNITED STATES PATENTS

| | | | |
|---|---|---|---|
| 3,235,662 | 2/1966 | Bopp. | |
| 3,238,300 | 3/1966 | Bopp et al. | 178—69.5 |
| 2,753,396 | 7/1956 | Gore. | |
| 3,420,951 | 1/1969 | Gunther. | |
| 2,752,424 | 6/1956 | Pugsley. | |

RICHARD MURRAY, Primary Examiner

A. H. EDDLEMAN, Assistant Examiner